Jan. 12, 1932.  R. E. CAVERLY  1,841,239
CUTTER AND PARER
Filed Sept. 17, 1930
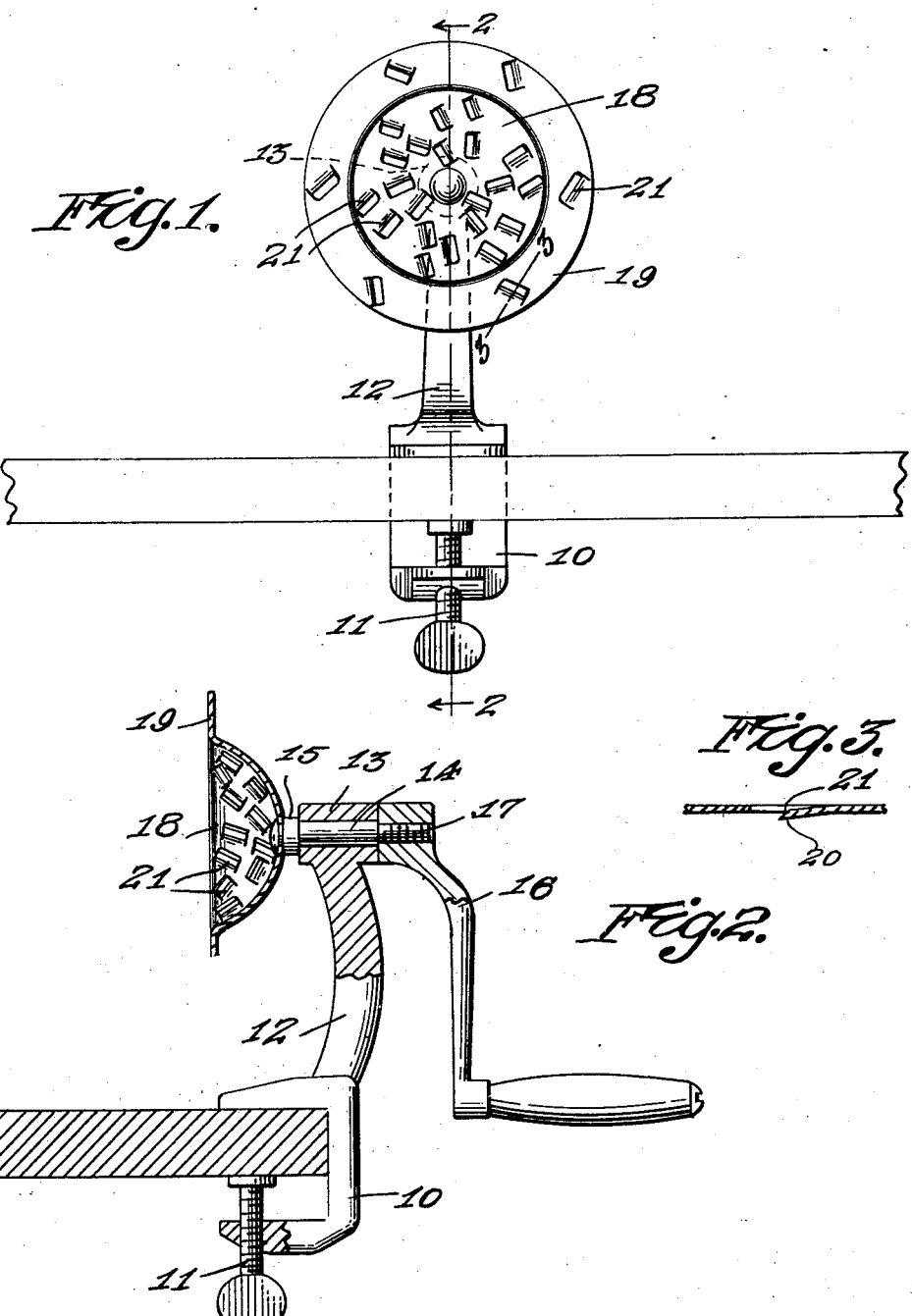

Patented Jan. 12, 1932

1,841,239

UNITED STATES PATENT OFFICE

RUSSELL E. CAVERLY, OF CLEVELAND, OHIO

CUTTER AND PARER

Application filed September 17, 1930. Serial No. 482,603.

This invention relates to paring and cutting devices for vegetables and the like and which embodies among other characteristics a cutting element designed for the accommodation of appropriate portions of vegetables without slipping during the paring or cutting operation.

An additional object of the invention consists of cutter blades for the cutting element being disposed in such manner as to cut and discharge the skin, rinds, or bulk of a vegetable or fruit in an effective and expeditious manner.

More specifically stated the device is provided with a support upon which the cutting element is mounted for rotation.

With the above and other objects in view, the invention further consists of the following novel features and details of construction, to be hereinafter more fully described, illustrated in the accompanying drawings and pointed out in the appended claims.

In the drawings:—

Figure 1 is a front elevation of the present invention.

Figure 2 is a longitudinal sectional view taken on line 2—2 of Figure 1.

Figure 3 is a fragmentary detail sectional view taken on line 3—3 of Figure 1.

Referring to the drawings in detail wherein like characters of reference denote corresponding parts, the reference character 10 indicates generally a clamp having an adjustably mounted bolt member 11 for detachably securing a standard 12 upon the edge of a table top or the like. A bearing sleeve 13, horizontally positioned upon the uppermost end of the standard 12, accommodates an appropriate portion of a shaft member 14 provided with an enlargement or head 15 adjacent one end to restrict movement thereof in one direction through said sleeve.

A handle member 16 having detachable connection with the threaded extremity 17 of the shaft 14 projecting outwardly and beyond the sleeve 13 is designed for simultaneous movement with the shaft 14 during the cutting operation.

The cutting element, alluded to in the foregoing, consists of a cup-shaped body 18 provided with an outstanding flange portion 19. The cup-shaped portion and flange of the cutter body are each provided with cutter blades 20 struck or otherwise swaged therefrom in the manner suggested in Figure 3 of the drawings and beveled, as at 21, to provide cutting edges. The several cutting blades are angularly disposed with relation to the horizontal center of the cutting element by means of which draw cutting or slicing of the food or vegetable will be facilitated thereby resulting in a material degree of pressure against the operating handle 16.

Although I have mentioned that the invention is primarily designed for use in the cutting of rinds and fruits, the paring of vegetables, it is also my purpose to employ the invention to equal effect in the slicing of cabbages and the like for the manufacture of cold slaw, salads and the like. In the latter case, both the cup-shaped portion 18 and the flange 19 will be simultaneously employed. It is obviously apparent that the cup-shaped portion 18 of the cutter will prevent accidental displacement of fruits and vegetables during the cutting and paring operations whereby the user's hands will not be subjected to contact with the several cutting blades.

The invention is susceptible of various changes in its form, proportions and minor details of construction and the right is herein reserved to make such changes as properly fall within the scope of the appended claims.

Having described the invention, what is claimed is:

1. A cutter and paring implement comprising a rotary operable cutting element, said element being of cup-shape formation, a flange outstanding from the periphery of the cutting element, and lying in a plane at a right angle to the axis of the cutting element and blades upon the cup-shaped portion and flange.

2. A cutting and paring implement comprising a rotary operable cutting element having a cup-shaped work receiving portion, a flange carried by and outwardly projected from the peripheral edge of the cup-shaped portion, and lying in a plane at a right angle to the axis of the cutting element and blades struck from the cup-shaped portion and flange being angularly disposed to the horizontal center of the cutting element.

In testimony whereof I affix my signature.

RUSSELL E. CAVERLY.